UNITED STATES PATENT OFFICE.

ANDREW PETERS, OF BROOKLYN, NEW YORK.

BAKING-POWDER.

SPECIFICATION forming part of Letters Patent No. 315,832, dated April 14, 1885.

Application filed May 23, 1884. (No specimens.)

*To all whom it may concern:*

Be it known that I, ANDREW PETERS, a citizen of the United States, residing at the city of Brooklyn, in the county of Kings, State of New York, have invented a new and useful Improvement in Baking-Powders, of which the following is a specification.

My invention consists in the production of a new baking-powder, in which boracic acid forms an essential ingredient.

In the ordinary baking-powders heretofore employed containing large proportions of a carbonate of an alkali, it is impossible to employ the ordinary boracic acid, in consequence of the tendency of the boracic acid to act spontaneously upon the carbonate of the alkali.

I have discovered that by mixing with the boracic acid sufficient of a carbonate of magnesia to neutralize as much as one-third or more of the boracic acid an efficient and lasting baking-powder may be obtained.

The following proportions may be employed: two hundred and forty-eight parts, by weight, boracic acid, ($OB_3H_3$;) one hundred and twenty-six parts bicarbonate of magnesia, ($M_9CO_3$;) but in lieu of one-third of this carbonate of magnesia, I prefer, ordinarily, to employ sufficient bicarbonate of soda to neutralize one-third of the boracic acid, the remaining two-thirds being neutralized by the carbonate of magnesia—that is to say, I prefer to use eighty-four parts, by weight, carbonate of magnesia, and eighty-four parts, by weight, of bicarbonate of soda, with two hundred and forty-eight parts, by weight, boracic acid.

My improved baking-powder is put up in a dry state in cans, cases, packages, or bottles. While in the dry state it remains unchanged, but when used in baking, the liquid and heat which are used in the operation cause the boracic acid to unite with the carbonate of magnesia, and also with the carbonate of the alkali, in case the latter is used, thereby liberating the carbonic-acid gas, which raises the dough.

When used for baking, the following proportions are employed: about two tea-spoonfuls of baking-powder to one quart of flour, one tea-spoonful of salt, one-half tea-spoonful of sugar, and one and one-half pint of milk; but of course some of the above ingredients may be omitted or their proportions varied with perfectly good results.

I do not limit myself to the employment of a carbonate of an alkali in the powder, nor do I limit myself to the employment of the exact proportions named. The borates have hitherto been considered by some as having a deleterious effect upon the system when used constantly; but there is as good authority for a contrary theory, and perhaps better. The United States Dispensatory, fourteenth edition, under this title, characterizes boracic acid as being a "mild refrigerant," and Dumas and Bedouin, referred to by Muspratt's Chemie, (German,) fifth volume of third edition, under article "Saures," pages 445 and 446, are authority to the same effect.

I claim—

A baking-powder containing as essential ingredients boracic acid and the carbonate of magnesia.

ANDW. PETERS.

Witnesses:
 DANIEL H. DRISCOLL,
 EDWARD T. ROCHE.